July 7, 1925.  
E. NELSON  
1,545,439  
PROCESS AND IMPROVED MOLD FOR MAKING VEHICLE TIRES; AND IMPROVEMENT IN TIRES  
Filed Jan. 19, 1923  
3 Sheets-Sheet 1

Inventor  
Edward Nelson  
By his Attorney  
E. W. Scherr Jr.

July 7, 1925. 1,545,439

E. NELSON

PROCESS AND IMPROVED MOLD FOR MAKING VEHICLE TIRES; AND IMPROVEMENT IN TIRES

Filed Jan. 19, 1923  3 Sheets-Sheet 2

Inventor
Edward Nelson
By his Attorney E.W. Scherr Jr

July 7, 1925.                                          1,545,439
                      E. NELSON
PROCESS AND IMPROVED MOLD FOR MAKING VEHICLE TIRES; AND IMPROVEMENT IN TIRES
              Filed Jan. 19, 1923         3 Sheets-Sheet 3

Inventor
Edward Nelson
By his Attorney

Patented July 7, 1925.

1,545,439

UNITED STATES PATENT OFFICE.

EDWARD NELSON, OF BELLEVILLE, NEW JERSEY, ASSIGNOR TO O. & W. COMPANY, A CORPORATION OF NEW YORK.

PROCESS AND IMPROVED MOLD FOR MAKING VEHICLE TIRES, AND IMPROVEMENT IN TIRES.

Application filed January 19, 1923. Serial No. 613,693.

*To all whom it may concern:*

Be it known that I, EDWARD NELSON, a citizen of the United States, residing at Belleville, New Jersey, have invented certain new and useful Improvements in Processes and Improved Molds for Making Vehicle Tires, and Improvements in Tires, of which the following is a specification.

Figure 3:
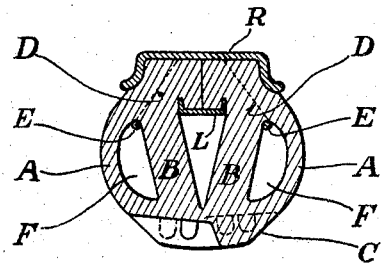

My present invention relates to an improved process and mold for making vehicle tires, including tires containing closed cavities such, for instance, as the tire illustrated in Fig. 3 of the annexed drawings, and is an improvement on the process, mold and tire of my co-pending application Serial No. 575,150, filed July 15, 1922.

At that time I thought it desirable to premold the tire in separated units out of the uncured rubber or rubber compound and then to pein and press said units together to make the unitary tire before vulcanizing same with the tire cavities distended by fluid pressure.

I have now discovered that a better way is to premold the entire tire as a unitary structure out of the uncured material, thereby avoiding any joints and therefore any possible weakness at the tread portion, and thereby insuring a uniform and solid structure at said tread, the importance of which will be readily appreciated when it is considered that this is the part of the tire subjected to extreme punishment when in service.

Another improvement is locating the basal peined joints between the inner and outer walls in such a way that the length of the joint to be peined is considerably shortened and is situated to one side of the path of the tread thrusts transmitted to the base through the load-supporting and shock-absorbing inner walls.

My present invention also includes the herein described improvements in tires and tire molds.

Figure 1:
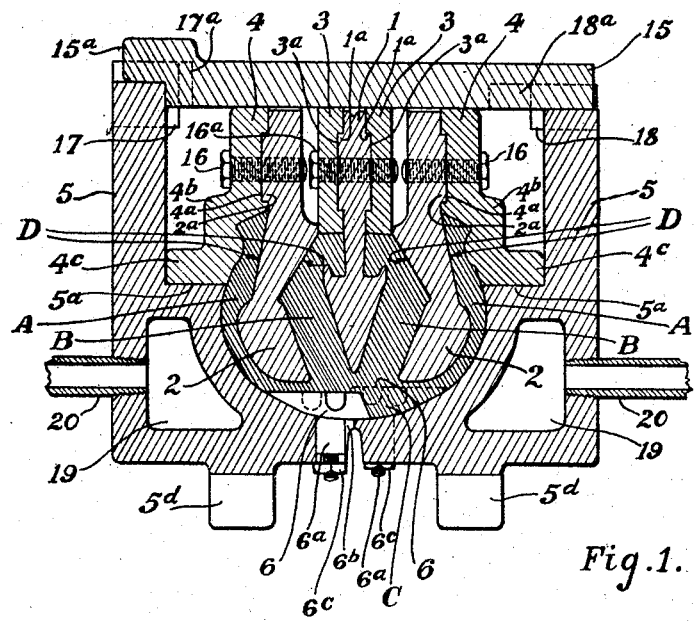
Figure 2:
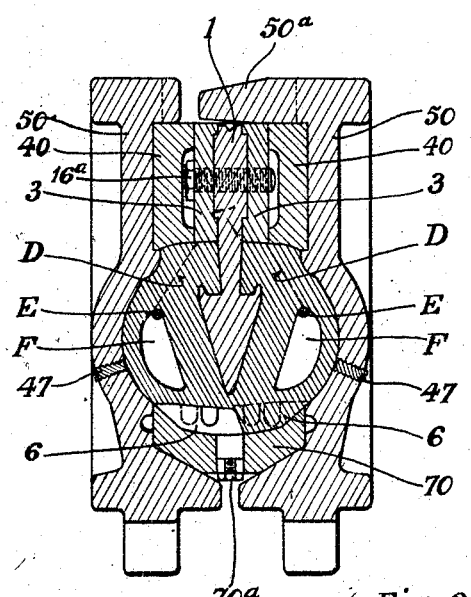
Figure 4:
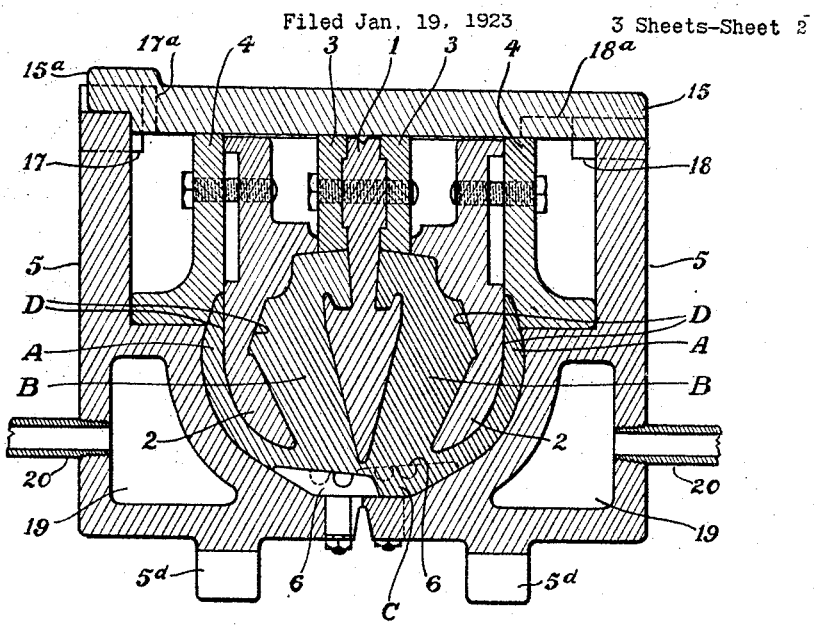
Figure 5:
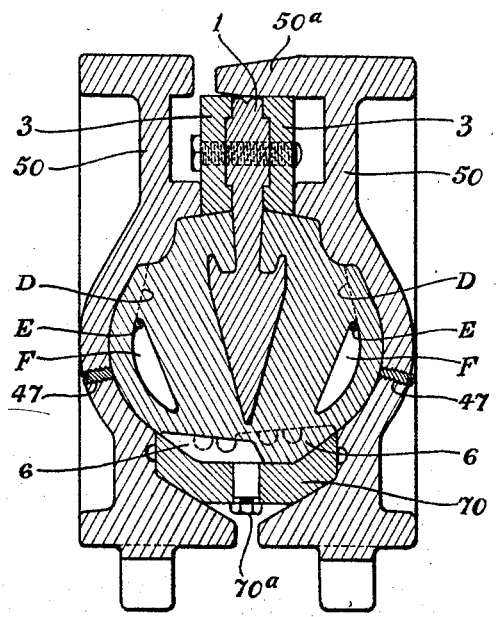
Figure 6:
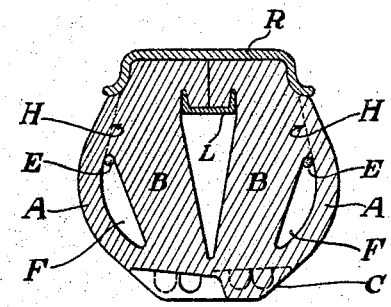
Figure 7:
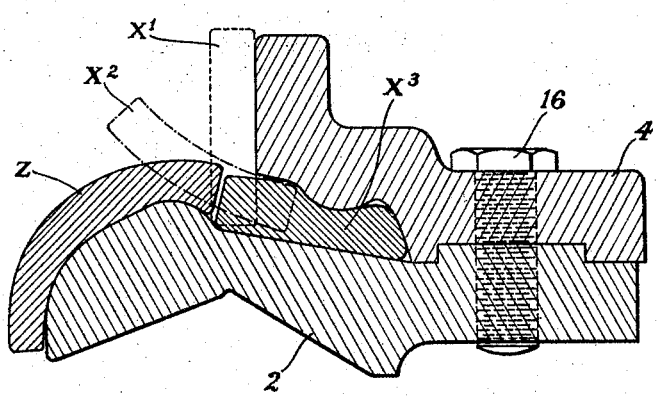

In the drawings, illustrating my present improvements by certain preferred embodiments of my invention, Fig. 1 is a radial cross-section through a mold for premolding a tire as a unitary structure out of the uncured material, the premolded tire being shown molded therein; Fig. 2 is a radial cross-section through a vulcanizing mold containing the said uncured tire after the basal joints have been integrated and the tire has been mounted therein preparatory to vulcanizing it; Fig. 3 is a cross-section through the finished or vulcanized tire of Figs. 1 and 2 showing it mounted on a tire rim; Fig. 4 is a radial cross-section through a premolding mold containing a tire wherein the peined basal joints are differently located as will be later pointed out; Fig. 5 is a radial cross-section through the vulcanizing mold containing this latter tire; Fig. 6 is a cross-section through the finished tire of Figs. 4 and 5 showing it mounted on a tire rim; and Fig. 7 is an enlarged detail view later described.

Referring now to the drawings in which the same reference characters indicate the same or corresponding parts in all the views, I will first describe the mold and tire shown in Figs. 1, 2 and 3, and the process applicable thereto, and later point out the further improvements in connection wnth the tire and mold shown in Figs. 4, 5 and 6. It will be understood that while all of the views are in cross-section, all of the parts shown in section exist as complete circular rings, unless otherwise specified. It will also be understood that where I use expressions of relative position such as upper, lower, above or below, they refer to the relative position of the parts in the views shown with the tread of the tire downward.

The mold of Fig. 1 comprises the central and lateral core rings 1 and 2—2 respectively separated by the two spacing rings 3—3, the latter being fastened by bolts 16ª to opposite sides of said central core ring 1 which is centered on them by the coacting tongues 1ª—1ª and grooves 3ª—3ª.

4—4 are basal side rings centering by similar coacting tongues and grooves 2ª—2ª and 4ª—4ª, and fastened by bolts 16 to the outer sides of, the lateral core rings 2—2 respectively, said side rings having elbow-shaped offsets 4ᵇ—4ᵇ for forming the basal ends of the outer walls A of the tire of Fig. 3, and further having the substantially cylindrical lateral extensions 4ᶜ—4ᶜ.

5—5 are the main side rings of the mold for forming the rest of the outer side-contour and tread of the tire, and also having substantially cylindrical lateral extensions 5ᵃ adapted to surround the aforesaid cylindrical extensions 4ᶜ of the basal side rings when the mold has been assembled. These main side rings 5—5 come together at the tread and there detachably carry the usual cores 6 for molding the openings in the tread portion, the cores 6 being formed with squared and threaded shanks 6ᵃ fitting in slots 6ᵇ formed at spaced circumferential intervals around the rings 5, the slots in one of the rings 5 being staggered with reference to those in the other ring 5. These cores 6 are secured to the rings 5 by the nuts 6ᶜ, the general features of these tread cores being substantially as shown and described in Overman United States Pat. No. 1,223,726.

15 is a centering guide ring around which all of the other rings are centered, and in order to secure the proper spacing of the tread inserts 6 that are carried by one of the main side rings 5 with respect to the tread inserts 6 carried by the other main side ring 5, these side rings 5 are brought into their proper relationship with each other by the locating keys 17 and 18 carried by the rings 5 coacting with suitable slots or keyways 17ᵃ and 18ᵃ respectively in the centering ring 15. All of these rings except the central core ring 1 and the lateral core rings 2—2 are preferably continuous and undivided circumferentially, but the core rings 1 and 2—2 are circumferentially divided into several parts, one of the parts of each having parallel ends to enable these core rings to be removed piece by piece from the premolded tire after it is formed, substantially as shown in the aforesaid Overman Pat. 1,223,726. The several parts of the core ring 1 when assembled are held together as a practically continuous ring by means of the two spacing rings 3—3 and the bolts 16ᵃ. Similarly the several parts of each of the lateral core rings 2—2 are held together as a practically continous ring by the basal side rings 4—4 and the bolts 16 after these latter rings are assembled with them in the process of premolding the tire.

My process of premolding a tire with this mold is as follows: The main side ring 5, shown at the left of Fig. 1 is first laid down flat with is outer face at the bottom and the centering ring 15 is placed on this, the ledge 15ᵃ thereof centering in the central bore of the ring 5 and the key 17 and coacting keyway 17ᵃ locating them with respect to each other. The cores 6 for the tread inserts are bolted in place in the slots 6ᵇ in both of the rings 5—5.

The several sections or parts of each of the core rings 2—2 are then secured by the bolts 16 in their proper positions on their respective basal ring 4, and each of these sets is then laid down on a table or bench with the concave or re-entrant face of the ring 2 downward as in Fig. 7. Strips of uncured tire material, of the same or of a harder rubber compound than the rest of the tire, are then separately wound up into two parallel rings or bands on a drum (of a diameter substantially the same as that of the cylindrical lateral extensions 4ᶜ of the side-rings 4) in successive superposed layers (thereby effectively excluding air-pockets therefrom) to a thickness slightly less than the width of the space or cavity between the ring 2 and the ring 4 in Fig. 1 and of a width somewhat greater than the depth of the said cavity, the exact width depending on whether the rubber compound is the same as, or different from, that of the rest of the tire, and if different, how far down on the outer wall A of the tire it is desired that the harder material extend. These bands of rubber compound are then removed from the winding drum; and the web of each is given a half or partial turn or twist on itself as it is inserted edgewise and tamped into the cavity between the rings 2 and 4 of each set, as indicated by the successive dotted and solid outlines $x'$, $x^2$ and $x^3$ of Fig. 7, until it substantially fills the same and protrudes outside to an amount dependent on the depth it is desired that this compound shall extend in the outer walls A of the tire.

Two other bands of uncured rubber compound (of whatever vulcanization characteristics may be desired) are then wound up on a drum of suitably larger diameter till each of the said bands is of the proper thickness and of a width substantially equal to the distance from the outer edge of the previously inserted band to the outermost point of the respective core ring 2. Each of these bands of compound is then removed from its drum and its web given a half turn on itself and is then laid down on the top- or convex-face of one of the core rings 2 to continue the formation of the tire-walls A, as indicated by $z$ in Fig. 7.

One of these sets of core rings 2 and base-rings 4 with the two rings of compound applied thereto as aforesaid, and sticking to it by reason of the tacky condition of the compound, is then turned over and lowered into the ring 5 and around the ring 15.

Two more bands of rubber compound are then wound up on a drum of suitable diameter, each being of a thickness somewhat greater than the finished thickness of one of the two middle or interior walls B of the finished tire, and of a width approximately equal to the width of the concave or re-entrant face of the core ring 2. Each of these bands of compound is then removed from the winding drum and its web given a half turn on itself, and one of them is then laid on the upper concave face of the aforesaid core ring 2 previously placed in the ring 5.

The central core ring 1, after being assembled with and bolted to the two spacing rings 3—3, is then laid down on this band of rubber compound; and the other band of compound, above provided for, is then laid down on top of said core ring.

The other set of core ring 2 and base ring 4, previously prepared as directed above, with the two bands of rubber compound sticking thereto is then placed concave face downward on the last mentioned band of rubber compound for the right hand inner wall of the tire.

The right hand main side ring 5 is then placed in position over the centering ring 15 and on top of the other rings, the key 18 coacting with the keyway $18^a$ in the ring 5 to properly position it and the tread cores 6 carried by it with respect to the other ring 5 (and its tread cores 6) which is positioned by the key 17 and coacting keyway $17^a$ in this ring 5.

The whole mold is then transferred to a suitable power-press and forced together to the position illustrated in Fig. 1, the several bands of rubber compound being squeezed into a unitary body, filling the mold and flowing to form the tread portion C of the tire, with the surplus compound oozing or spewing out through the narrow surface of contact at the center line between the two main rings 5. After the mold is thus closed, it is either left in the press for a suitable time or is held together, as by bolts (not shown) connecting the lugs $5^d$, and while thus held closed, steam introduced through the pipes 20—20 is circulated through the jacket cavities 19—19 in each of the rings 5 to cause a slight preliminary vulcanizing or setting of the adjacent portions of the thin outer walls A of the tire so they will not be distorted in handling them during the later operation of removing the outer core rings 2—2 from the premolded tire. It is to be noted that the jacket cavities 19—19 encircle only a limited portion of the outer walls of the tire, this being purposely limited to prevent the heat from affecting the straight inner face D of these outer walls where they are later to be integrated with the corresponding faces D of the inner walls, these straight faces being thus kept in their tacky, sticky condition to ensure a better integrating of them together.

After a suitable time in the press or other clamping device, the mold is removed and disassembled, the tread cores 6—6 being loosened from the rings 5 before the pressure is relieved so that, as the mold tends to open, the tread cores will remain with the tire and not tear it by being dragged through the soft material. After removing the main rings 5 and the centering ring 15, the bolts 16 are removed and the rings 4 are removed. The split or sectional core rings 2—2 are then pulled inwardly piece by piece, only the central core ring 1 and spacing rings 3—3 mounted thereon being left in the premolded tire.

The opposing faces D of the straight inner portions of the inner and outer walls B and A are then cleaned by suitably washing them, and with the premolded tire properly held as a ring in a horizontal position, capsules or other readily meltable containers containing a suitable gaseous forming material are introduced into the outer portion of the cavity between the inner and outer tire walls which are uppermost, the amount of the said gaseous forming material being referred to later.

An endless hoop or ring E of wire, or plaited wire-cable, is then introduced into said cavity F, the inner circumference of the wire hoop being just the right size to lay snugly in the circumferentially innermost part of the said cavity when the basal portion of the outer wall A is closed against the inner one B. The outer wall is then forced down to bring its straight face D into intimate contact with the straight face of the inner wall, and the outer wall is then peined and rolled on top of this joint until the said surfaces are well joined together.

The tire is then turned over and similar operations are performed in enclosing the cavity F between the tire walls on that side, including the placing of the wire hoop and the insertion of the capsules of gaseous forming material, as well as the peining and rolling to unite the straight inner portions of said walls.

The tire, with the core ring 1 and spacing rings 3—3 still in place, is then placed in the vulcanizing mold, as shown in Fig. 2. In this mold the base rings 40—40 are centered in the main mold rings 50—50, the central core ring 1 through the spacing rings 3—3 being centered on a protruding annular lip $50^a$ of the right hand main ring 50. The tread cores 6 are here carried by a sectional tread ring 70 to which they may be rigidly secured, as by the bolts $70^a$. This tread ring 70 is divided into circumferential segments and is provided on its outer circumference with a double beveled outer face coacting with a similar bevel on the inner face of each of the main rings 50—50, whereby as the said main rings are forced together the said tread ring 70 is caused to contract its circumference and thus press on the tread of the tire. After this vulcanizing mold has been assembled approximately as shown in Fig. 2, it is put into a vulcanizing oven-press which closes it forcibly together and it is there so held while subjected to a suitable temperature for a suitable period to effect proper vulcanization of the tire.

The amount of gaseous forming material introduced into each of the cavities between the outer and inner walls of the tire is so determined as to result in a gaseous pressure being generated by the vulcanizing temperature in the said cavities that will properly resist any tendency of the vulcanizing process to deform or substantially decrease the size of the said cavities and will also ensure a proper pressure on the rubber compound while it is being vulcanized.

Fig. 6 shows another tire adapted to be made by the aforesaid process which differs from the tire of Fig. 3 in that the mechanically unified vulcanized joints H between its inner and outer walls are positioned outside of the direct path of the tread thrusts transmitted to the base through the main load-supporting and shock-absorbing walls B. Also, the length of said joints H are considerably shorter than the joints D in the tire of Fig. 3.

The shorter joints H are more readily peined together than the joints D; and moreover, after said joints have been unified and the tire vulcanized, there is less possibility in the tire of Fig. 6 of any imperfection in said joints leading to a break in the basal portion of the tire, because the planes of union are not located in or across the path of the direct tread thrusts, but to one side of them.

The general process of making said tire of Fig. 6 is the same as that already described for the tire of Fig. 3, except for minor changes in the form of some of the parts of the premolding mold of Fig. 4, and of the vulcanizing mold of Fig. 5, made necessary by the aforesaid structural difference in the two tires, said changes in form of said parts of these molds being apparent on the face of the drawings by comparing the details of Figs. 4 and 5 with the correspondingly numbered parts in Figs. 1 and 2 respectively.

Referring again to the general process, it should also be stated that after vulcanization is completed and the vulcanizing mold with the tire therein has been removed from the oven, the gases that are confined under pressure in the outer cavities of the tire are released by inserting a small tube, or by other suitable venting means inserted through the outer walls of the tire into communication with said cavities, said venting being performed before the tire is removed from the mold, thus preventing distortion of the warm tire by said internal gaseous pressure. To permit the insertion of said venting tube, the main side rings 50 of the mold are provided with a threaded hole kept normally closed by a screw plug 47 (Fig. 2).

As shown in Figs. 3 and 6, the tires are applied to standard straight side rims R commonly used for pneumatic tires, it being one of the special features of my present tire that it is readily interchangeable on the same rims with standard straight side pneumatic tires of the same nominal size. The tires are secured to these rims by their bases being made of an internal circumference slightly less than that of the portion of the rim on which the base rests. Before the tire is applied to the rim an unbroken hoop L of metal of channel section is inserted through the divided base into the central cavity, with the flanges of the channel locking the two inner walls of the tire together. When the rim R, if it is of the transversely split type, is applied to the tire, and expanded and locked into position in the usual way, the rubber in the base of the tire is compressed between the said rim and the hoop L, thus firmly securing the tire to the said rim. If the rim is of the laterally divided type, the tire is forced on to it laterally by a suitable press and the laterally divided parts are then locked in the usual way.

It is to be noted that the wire hoops or rings E in the cavities F add greatly to the lateral stability of the tire, since they exert a radially restraining force on both the outer and inner walls against any laterally acting force tending to rock the tire laterally on the rim.

Possible changes and modifications may be made in the practical carrying out of my process and in the practical embodiment of my improvements in mold and improvements in tires, which will nevertheless still be within the meaning and spirit of the foregoing disclosure and within the meaning and spirit of the annexed claims and which as such are accordingly intended to be covered thereby.

What I claim is:

1. The process of making tires having laterally spaced inner and outer walls comprising molding said tires of uncured tire material with said walls forming a unitary jointless structure with a tread portion; unifying the basal portions of said walls to form enclosed cavities between said walls; vulcanizing said tire; and keeping said cavities expanded by fluid pressure during vulcanization.

2. The process of molding tires comprising forming of uncured tire material a substantially cylindrical band of suitable diameter, width and thickness relative to the annular space to be filled in a tire mold; and twisting the web of said band to convert its cylindrical form to a flattened form and placing it into the mold space to be filled.

3. The process of molding tires comprising winding a strip of uncured tire material to form a substantially cylindrical band of suitable diameter, width and thickness relative to the annular space to be filled in a tire mold; and twisting the web of said band to convert its cylindrical form to a flattened form and placing it into the mold space to be filled.

4. The process of making tires having laterally spaced inner and outer walls which comprises molding said tires of uncured tire material with said walls united by a tread portion; and partially vulcanizing a predetermined portion of the tire in the mold.

5. The process of making tires having laterally spaced inner and outer walls which comprises molding said tires of uncured tire material with said walls united by a tread portion; partially vulcanizing the tread-adjacent portions of the outer walls in the mold; removing the mold; unifying the basal portions of the inner and outer walls to form enclosed cavities between said walls; and vulcanizing said tire.

6. The process of making tires having laterally spaced inner and outer walls which comprises molding said tires of uncured tire material with said walls united by a tread portion; partially vulcanizing the tread-adjacent portions of the outer walls in the mold; removing the mold; unifying the basal portions of the inner and outer walls to form enclosed cavities between said walls; inserting a tire-securing ring in each of said cavities before closing same; and vulcanizing said tire.

7. The process of making tires having laterally spaced inner and outer walls which comprises molding said tires of uncured tire material with said walls united by a tread portion; partially vulcanizing the tread-adjacent portions of the outer walls in the mold; removing the mold; unifying the basal portions of the inner and outer walls to form enclosed cavities between said walls; vulcanizing said tire; and keeping said cavities expanded by fluid pressure during vulcanization.

8. The process of making tires having laterally spaced inner and outer walls which comprises molding said tires of uncured tire material with said walls united by a tread portion; partially vulcanizing the tread-adjacent portions of the outer walls in the mold; removing the mold; unifying the basal portions of the inner and outer walls to form enclosed cavities between said walls; inserting a tire-securing ring in each of said cavities before closing same; vulcanizing said tire; and keeping said cavities expanded by fluid pressure during vulcanization.

9. The process of making tires having laterally spaced inner and outer walls which comprises forming said tires of uncured tire material with said walls united by a tread portion; unifying the basal portions of the inner and outer walls to form enclosed cavities between said walls; inserting a tire-securing ring in each of said cavities before closing same; and vulcanizing the tire.

10. The process of making tires having laterally spaced inner and outer walls which comprises forming said tires of uncured tire material with said walls united by a tread portion; unifying the basal portions of the inner and outer walls to form enclosed cavities between said walls; inserting a tire-securing ring in each of said cavities before closing same; vulcanizing the tire; and keeping said cavities expanded by fluid pressure during vulcanization.

11. In a tire, the combination of spaced inner and outer walls having a jointless union with a tread portion, the basal portions of the outer walls being jointed to the inner to form enclosed cavities between said walls, said joints being located outside of the direct path of the tread thrusts through the inner of said walls.

12. In a tire, the combination of spaced inner and outer walls, a tread portion uniting the tread portions of said walls, the basal ends of said walls being united to form enclosed cavities between said walls; and a tire-securing ring in each of said cavities at the basal end thereof.

13. A mold for making tires having laterally spaced inner and outer walls united by a tread portion, said mold comprising spaced central and lateral core rings for forming said spaces; basal side rings adapted to mold the basal portions of the outer walls, same having substantially cylindrical lateral extensions; and other side rings adapted to mold the rest of the side and tread contour of the tire, also having substantially cylindrical lateral extensions fitting over the aforesaid cylindrical extensions on the basal side rings.

14. A mold for making tires having laterally spaced inner and outer walls united by a tread portion, said mold comprising spaced central and lateral core rings for forming said spaces; basal side rings adapted to mold the basal portions of the outer walls; and other side rings adapted to mold the rest of the side and tread contour of the tire, said latter rings being hollow adjacent said side contour of the tire to apply a vulcanizing medium thereto.

15. The process of vulcanizing tires having an enclosed cavity comprising vulcanizing said tire in a metallic mold, maintaining the shape of said cavity during vulcanization by using fluid pressure therein, and venting said pressure before the tire is released from said mold.

In testimony whereof, I have signed my name to this specification this 16th day of January, 1923.

EDWARD NELSON.